United States Patent
Zhao et al.

(10) Patent No.: US 12,538,332 B2
(45) Date of Patent: Jan. 27, 2026

(54) RESOURCE SET TRANSMISSION METHOD, AND TERMINALS

(71) Applicant: GUANGDONG OPPO MOBILE TELECOMMUNICATIONS CORP., LTD., Guangdong (CN)

(72) Inventors: Zhenshan Zhao, Dongguan (CN); Shichang Zhang, Dongguan (CN); Yi Ding, Dongguan (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 399 days.

(21) Appl. No.: 18/180,214

(22) Filed: Mar. 8, 2023

(65) Prior Publication Data
US 2023/0224928 A1    Jul. 13, 2023

Related U.S. Application Data

(63) Continuation of application No. PCT/CN2020/117951, filed on Sep. 25, 2020.

(51) Int. Cl.
*H04W 72/25* (2023.01)
*H04W 28/26* (2009.01)
(Continued)

(52) U.S. Cl.
CPC .......... *H04W 72/25* (2023.01); *H04W 28/26* (2013.01); *H04W 72/02* (2013.01); *H04L 5/0005* (2013.01)

(58) Field of Classification Search
None
See application file for complete search history.

(56) References Cited

U.S. PATENT DOCUMENTS

2016/0338094 A1  11/2016  Faurie et al.
2018/0279259 A1   9/2018  Gulati
(Continued)

FOREIGN PATENT DOCUMENTS

CN    109644436 A    4/2019
CN    110536449 A    12/2019
(Continued)

OTHER PUBLICATIONS

Notice of Reasons for Refusal of the Japanese application No. 2023-518320, issued on Nov. 29, 2024. 8 pages with English translation.
(Continued)

*Primary Examiner* — Peter P Chau
(74) *Attorney, Agent, or Firm* — PERKINS COIE LLP

(57) ABSTRACT

The present application relates to a resource set transmission method, and terminals. The resource set transmission method comprises: a first terminal sends a transmission resource set to a second terminal, a transmission resource comprised in the transmission resource set being a transmission resource within a first time-frequency range. According to implementations of the present application, the time-frequency range of a transmission resource set can be accurately determined, so that the sending end and the receiving end of the resource set can determine the same time-frequency range, so as to determine the time-frequency location corresponding to a transmission resource in the transmission resource set, and perform correct resource selection according to the transmission resource in the transmission resource set.

18 Claims, 7 Drawing Sheets

200 | A first terminal sends a transmission resource set to a second terminal, and a transmission resource included in the transmission resource set belongs to transmission resources in a first time-frequency range | S210

(51) Int. Cl.
*H04W 72/02* (2009.01)
*H04L 5/00* (2006.01)

(56) References Cited

U.S. PATENT DOCUMENTS

| | | | |
|---|---|---|---|
| 2021/0212023 A1 | 7/2021 | Zeng | |
| 2021/0410112 A1 | 12/2021 | Qu | |
| 2022/0046664 A1* | 2/2022 | Hosseini | H04W 72/40 |
| 2023/0171738 A1* | 6/2023 | Di Girolamo | H04W 72/02 |
| | | | 370/329 |
| 2023/0180271 A1* | 6/2023 | Guo | H04W 72/0446 |
| | | | 370/329 |
| 2023/0309065 A1* | 9/2023 | Leon Calvo | H04W 72/563 |

FOREIGN PATENT DOCUMENTS

| | | |
|---|---|---|
| CN | 110958096 A | 4/2020 |
| CN | 111246426 A | 6/2020 |
| CN | 111567070 A | 8/2020 |
| JP | 2019134422 A | 8/2019 |
| WO | 2017179286 A1 | 10/2017 |
| WO | 2018067400 A1 | 4/2018 |
| WO | 2019228321 | 12/2019 |
| WO | 2020006736 A1 | 1/2020 |
| WO | 2020006955 A1 | 1/2020 |
| WO | 2020015256 A1 | 1/2020 |
| WO | 2020053965 A1 | 3/2020 |
| WO | 2020056696 A1 | 3/2020 |
| WO | 2020088227 A1 | 5/2020 |

OTHER PUBLICATIONS

First Examination report of the Indian application No. 202317026878, issued on Dec. 26, 2024. 6 pages.
Extended European Search Report for European Application No. 20954642.3 issued Sep. 1, 2023, 8 Pages.
First Office Action of the Chinese application No. 202310312677.8, issued on Jul. 26, 2024. 17 pages with English translation.
First Office Action of the Japanese application No. 2023-518320, issued on Jul. 12, 2024. 7 pages with English translation.
Written Opinion Mailed Jun. 23, 2021 in Application No. PCT/CN2020/117951.
International Search Report Mailed Jun. 23, 2021 in Application No. PCT/CN2020/117951.
MediaTek Inc., On sidelink mode-2 resource allocation, 3GPP TSG RAN WG1 Meeting #97, R1-1906555, Reno, USA, May 13-17, 2019, 8 pages.
Futurewei, Views on resource allocation enhancements for sidelink communication, 3GPP TSG RAN WG1 Meeting #102-e, R1 2005296, eMeeting, Aug. 17 28, 2020, 3 pages.
Vivo, Discussion on mode 2 enhancements, 3GPP TSG RAN WG1 #102-e, R1-2005404, e-Meeting, Aug. 17-28, 2020, 5 pages.
LG Electronics, Discussion on feasibility and benefits for mode 2 enhancement, 3GPP TSG RAN WG1 Meeting 102-e, R1-2005749, e-Meeting, August 17 28, 2020, 9 pages.
Lenovo, Motorola Mobility, Sidelink resource allocation for Reliability enhancement, 3GPP TSG RAN WG1 #102-e, R1-2005840, E-meeting, August 17-Aug. 28, 2020, 3 pages.
ZTE, Sanechips, Inter UE coordination in mode 2, 3GPP TSG RAN WG1 #102-e, R1 2005961,e-Meeting, Aug. 17-28, 2020, 3 pages.
CMCC, Discussion on reliability and latency enhancements for mode 2 resource allocation, 3GPP TSG RAN WG1 #102-e, R1 2006231, eMeeting, August 17 28, 2020, 3 pages.
Ericsson, Feasibility and benefits of mode 2 enhancements for inter-UE coordination, 3GPP TSG-RAN WG1 Meeting #102-e, R1-2006445, e-Meeting, Aug. 17-28, 2020, 7 pages.
NTT DOCOMO, Inc., Discussion on sidelink resource allocation for reliability and latency enhancements, 3GPP TSG RAN WG1 #102, R1-2006748, e-Meeting, Aug. 17-28, 2020, 5 pages.
Qualcomm Incorporated, Reliability and Latency Enhancements for Mode 2, 3GPP TSG RAN WG1 Meeting #102-e, R1-2006829, Aug. 17-28, 2020, 10 pages.
Robert Bosch GmbH, Sidelink Resource Allocation Enhancements, 3GPP TSG RAN WG1 #102-e , R1-2006876, E-Meeting, August 17 28, 2020, 4 pages.
Examination Report No. 1 of the Australia application No. 2020469301, issued on Apr. 30, 2025. 3 pages.
Second examination report of Australian application No. 2020469301 issued on Jul. 31, 2025, 4 pages.
Notice of Preliminary Rejection of Korean application No. 10-2023-7012191 issued on Sep. 25, 2025, 12 pages with English translation.
3GPP, TS38.214 v16.2.0, NR, physical layer procedures for data, publication date Jul. 20, 2020, 163 pages.
Apple, R1-2006508, mode 2 Resource Allocation with Inter-UE Coordination, 3GPP TSG RAN WG1 #102-E, publication date Aug. 8, 2020, 3 pages.

\* cited by examiner

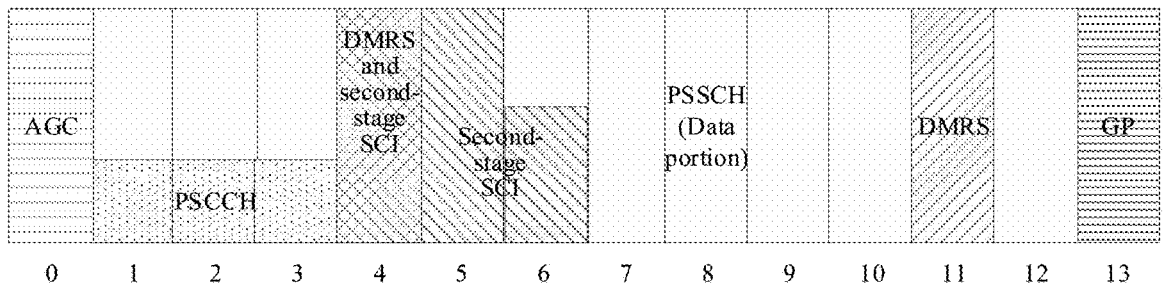

FIG. 4

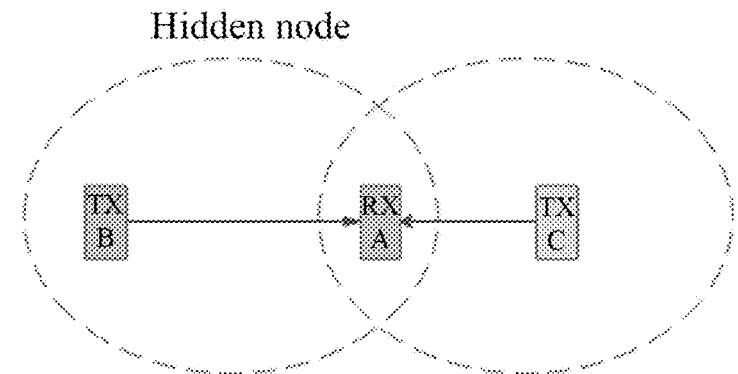

FIG. 5

| 200 | A first terminal sends a transmission resource set to a second terminal, and a transmission resource included in the transmission resource set belongs to transmission resources in a first time-frequency range | ⌐S210 |

FIG. 6

| 300 | A second terminal receives the transmission resource set from a first terminal, wherein the transmission resource included in the transmission resource set belongs to transmission resources in the first time-frequency range | ⌐S310 |

FIG. 7

RESOURCE SET TRANSMISSION METHOD, AND TERMINALS

CROSS-REFERENCE TO RELATED APPLICATION

This application is a continuation application of International Application No. PCT/CN2020/117951, filed on Sep. 25, 2020, the entire disclosure of which is hereby incorporated by reference.

TECHNICAL FIELD

The present application relates to the field of communication, and more specifically, to a transmission method of a resource set and a terminal device.

BACKGROUND

Device to Device (D2D) communication is a transmission technology based on Sidelink (SL). Different from the traditional cellular system in which communication data are received or sent through a base station, the D2D system has a higher spectrum efficiency and a lower transmission delay. Vehicle to Everything (V2X) system adopts terminal-to-terminal direct communication. In a sidelink transmission system, transmission resources of a terminal can be allocated by a base station, and the terminal can also select transmission resources in a resource pool. However, there are some problems in these methods, and it is necessary to optimize the way to determine the transmission resources.

SUMMARY

Implementations of the present application provide a transmission method of a resource set and a terminal, which can accurately determine a time-frequency range of a transmission resource set.

In an implementation of the present application, a transmission method of a resource set is provided, which comprises:
sending, by a first terminal, a transmission resource set to a second terminal, wherein a transmission resource included in the transmission resource set belongs to transmission resources in a first time-frequency range.

In an implementation of the present application, a transmission method of a resource set is provided, which comprises:
receiving, by a second terminal, a transmission resource set from a first terminal, wherein a transmission resource included in the transmission resource set belongs to transmission resources in a first time-frequency range.

In an implementation of the present application, a first terminal is provided, which comprises:
a sending unit, used to send a transmission resource set to a second terminal, wherein a transmission resource included in the transmission resource set belongs to transmission resources in a first time-frequency range.

In an implementation of the present application, a second terminal is provided, which comprises:
a receiving unit, used to receive a transmission resource set from a first terminal, wherein a transmission resource included in the transmission resource set belongs to transmission resources in a first time-frequency range.

In an implementation of the present application, a terminal device is provided, which includes a processor and a memory. The memory is used to store a computer program, and the processor is used to call and run the computer program stored in the memory to enable the terminal device to perform the transmission method of the resource set described above.

In an implementation of the present application, a network device is provided, which includes a processor and a memory. The memory is used to store a computer program, and the processor is used to call and run the computer program stored in the memory to enable the network device to perform the transmission method of the resource set described above.

In an implementation of the present application, a chip is provided, which is used to implement the transmission method of the resource set described above.

Specifically, the chip includes: a processor, used to call and run a computer program from a memory, to enable a device mounted with the chip to perform the transmission method of the resource set described above.

In an implementation of the present application, a computer readable storage medium is provided, which is used to store a computer program, when the computer program is executed by a device, the device is enabled to perform the transmission method of the resource set described above.

In an implementation of the present application, a computer program product is provided, which includes computer program instructions, wherein the computer program instructions enable a computer to perform the transmission method of the resource set described above.

In an implementation of the present application, a computer program is provided, when the computer program is run on a computer, the computer is enabled to perform the transmission method of the resource set described above.

In the implementations of the present application, the time-frequency range of the transmission resource set can be accurately determined, which is beneficial to making a sending end and a receiving end of the resource set determine the same time-frequency range, and further determine the time-frequency locations corresponding to the transmission resources in the transmission resource set, and perform a correct resource selection according to the transmission resources in the transmission resource set.

BRIEF DESCRIPTION OF DRAWINGS

FIG. 4 is a schematic diagram of frame structures of PSCCH and PSSCH.

FIG. 5 is a schematic diagram of a hidden node.

FIG. 6 is a schematic flowchart of a transmission method of a resource set according to an implementation of the present application.

FIG. 7 is a schematic flowchart of a transmission method of a resource set according to another implementation of the present application.

DETAILED DESCRIPTION

Figure 1:
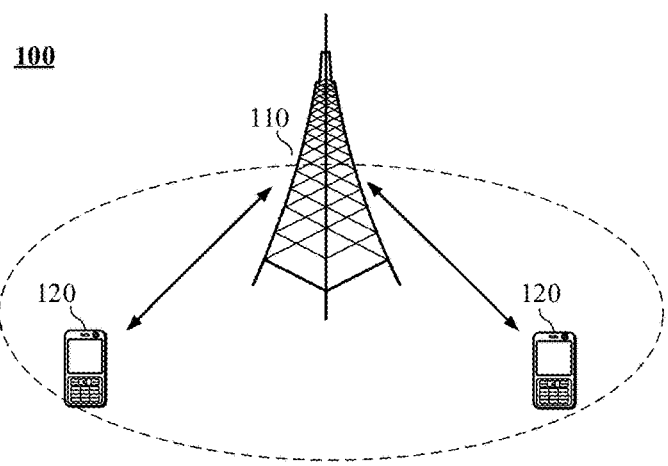
FIG. 1 is a schematic diagram of an application scenario according to an implementation of the present application.

Technical solutions in the implementations of the present application will be described below in combination with accompanying drawings in the implementations of the present application.

Technical solutions according to implementations of the present application may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunications System (UMTS), Wireless Local Area Networks (WLAN), Wireless Fidelity (WiFi), a 5th-generation (5G) communication system, or another communication system, etc.

Generally, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the implementations of the present application may be applied to these communication systems as well.

Optionally, the communication systems in the implementations of the present application can be applied to a carrier aggregation (CA) scenario, or a dual connectivity (DC) scenario, or a standalone (SA) networking scenario.

Optionally, the communication system in an implementation of the present application may be applied to an unlicensed spectrum, wherein the unlicensed spectrum may also be considered as a shared spectrum; or, the communication system in the implementation of the present application may also be applied to a licensed spectrum, wherein the licensed spectrum may also be considered as a non-shared spectrum.

Various implementations of the present application are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc.

The terminal device may be a STATION (ST) in a WLAN, or a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a terminal device in a next generation communication system, e.g., an NR network, or a terminal device in a future evolved Public Land Mobile Network (PLMN), etc.

In an implementation of the present application, a terminal device may be deployed on land including indoor or outdoor, handheld, wearable or vehicle-mounted terminal device; or it may be deployed on water (such as on ships, etc.); or it may be deployed aerially (such as in airplanes, balloons and satellites, etc.).

In an implementation of the present application, the terminal device may be a mobile phone, a Pad, a computer with wireless transceiving function, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

As an example rather than limitation, in the implementations of the present application, the terminal device may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices such as a smart watch or smart glasses, which are fully functional, have large sizes, and may implement complete or partial functions without relying on smart phones, and devices such as various smart bracelets, smart jewelries or the like for monitoring physical signs, which focus on a certain kind of application functions only and need to be used in conjunction with other devices such as smart phones.

In an implementation of the present application, the network device may be a device used for communicating with a mobile device, and may be an Access Point (AP) in the WLAN, a Base Transceiver Station (BTS) in GSM or CDMA, a NodeB (NB) in WCDMA, an evolutional Node B (eNB or eNodeB) in LTE, a relay station or an access point, a vehicle-mounted device, a wearable device, a network device (gNB) in the NR network, a network device in a future evolved PLMN network, or a network device in an NTN network, etc.

As an example rather than limitation, in an implementation of present application, the network device may be of mobility, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may be a base station disposed in a location on land or a water region etc.

In an implementation of the present application, the network device may provide a service for a cell, and the terminal device communicates with the network device through a transmission resource (e.g., a frequency domain resource, which is also referred to as a spectrum resource) used by the cell, wherein the cell may be a cell corresponding to the network device (e.g., a base station), and the cell may belong to a macro base station, or may belong to a base station corresponding to a Small cell. The Small cell herein may include a Metro cell, a Micro cell, a Pico cell, or a Femto cell, etc. The Small cells are characterized by a small coverage range and a low transmission power, and are suitable for providing high-speed data transmission services.

FIG. 1 illustrates an exemplary communication system 100. The communication system includes a network device 110 and two terminal devices 120. Optionally, the communication system 100 may include multiple network devices 110, and the coverage range of each network device 110 may include other quantity of terminal devices 120, which is not limited in the implementations of the present application.

Optionally, the communication system 100 may further include other network entities such as a Mobility Management Entity (MME), and an Access and Mobility Management Function (AMF), which is not limited in the implementations of the present application.

Herein, the network device may also include an access network device and a core network device. That is, the wireless communication system further includes multiple core networks that communicate with the access network device. The access network device may be an evolution node B (eNB or e-NodeB), a macro base station, a micro base station (also referred to as a "small base station"), a pico base station, an access point (AP), a transmission point (TP) or a new generation Node B (gNodeB) in a long-term evolution (LTE) system, a next-generation mobile communication system (next radio, NR) system or an authorized auxiliary access long-term evolution (LAA) system.

It should be understood that a device with a communication function in a network/system in the implementations of the present application may also be referred to as a communication device. Taking the communication system shown in FIG. 1 as an example, communication devices may include a network device and terminal devices which have communication functions, and the network device and the terminal device may be specific devices described in the implementations of the present application, and will not be described repeatedly herein. Communication devices may also include other devices in the communication system, for example, other network entities such as a network controller and a mobility management entity, which are not limited in the implementations of the present application.

It should be understood that the terms "system" and "network" are often used interchangeably herein. The term "and/or" herein describes an association relationship between associated objects only, indicating that there may be three relationships, for example, A and/or B may indicate three cases: A alone, A and B, and B alone. In addition, the symbol "/" herein generally indicates that there is a "or" relationship between the associated objects before and after "/".

It should be understood that "indication" involved in implementations of the present application may be a direct indication, may be an indirect indication, or may represent an association relationship. For example, that A indicates B may mean that A indicates B directly, for example, B can be acquired through A; or it may mean that A indicates B indirectly, for example, A indicates C, and B can be acquired through C; or it may mean that there is an association between A and B.

In the description of the implementations of the present application, the term "correspond" may mean that there is a directly corresponding or an indirectly corresponding relationship between two parties, or mean that there is an association between two parties, or mean a relationship such as indicating and being indicated, configuring and being configured, etc.

In order to facilitate understanding of technical solutions of the implementations of the present application, the related art of the implementations of the present application are described below, and as alternative solutions, the following related art may be arbitrarily combined with the technical solutions of the implementations of the present application, which should be subject to the protection scope of the implementations of the present application.

The technical solution of the implementations of the present application can be applied to sidelink communication under different network coverage environments. In sidelink communication, multiple types can be classified according to the coverage situation of a network in which the terminals performing communications are located. For example, sidelink communication within the network coverage, sidelink communication within partial network coverage, and sidelink communication out of the network coverage, are shown in FIG. 2a, FIG. 2b and FIG. 2c respectively.

Figure 2A:
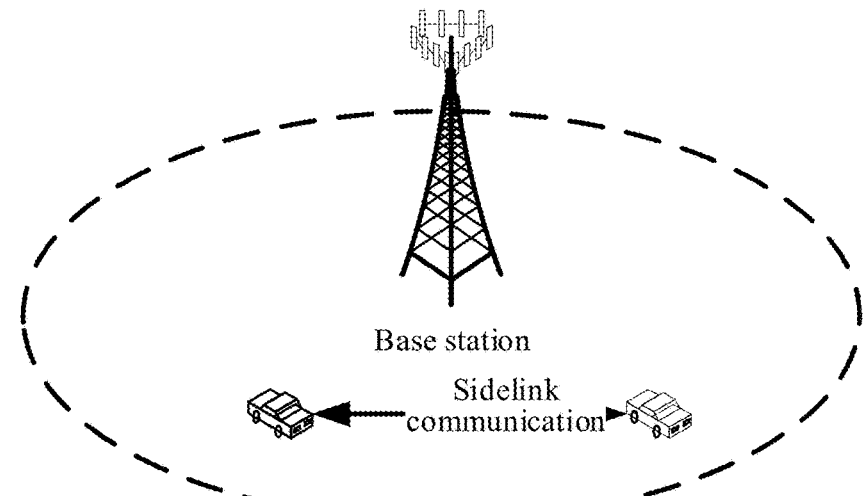
FIG. 2a is a schematic diagram of sidelink communication within a network coverage area.

As shown in FIG. 2a, in sidelink communication within the coverage of the network, all the terminals performing the sidelink communication are within the coverage range of the same base station, so that all the terminals can perform the sidelink communication based on the same sidelink configuration by receiving the configuration signaling of the base station.

Figure 2B:
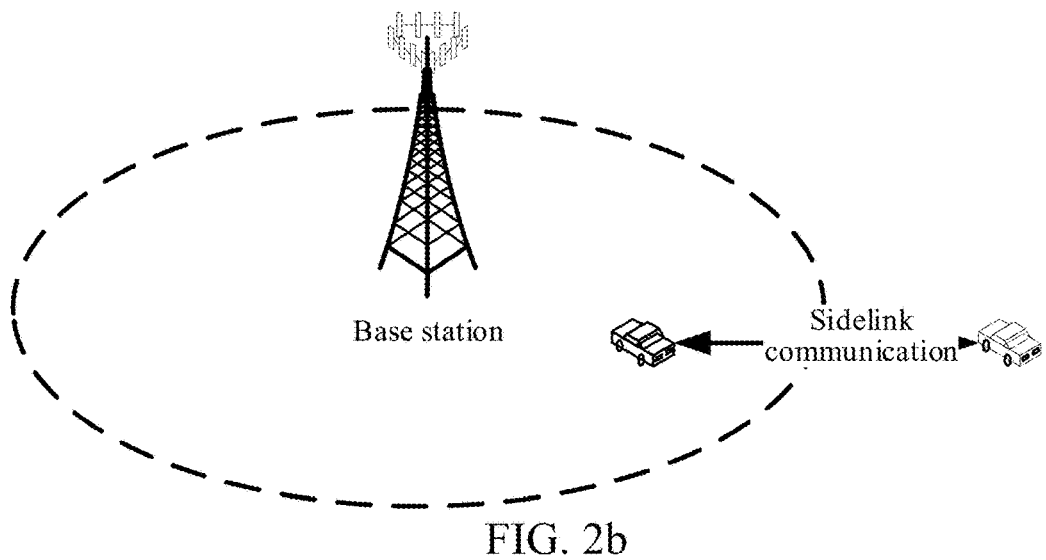
FIG. 2b is a schematic diagram of sidelink communication partially covered by a network.

As shown in FIG. 2b, in the case of sidelink communication within partial coverage range of the network, part of the terminals performing the sidelink communication are located within the coverage range of a base station. This part of the terminals can receive the configuration signaling of the base station and carry out the sidelink communication according to the configuration of the base station. However, terminals located outside the coverage range of the network cannot receive the configuration signaling of the base station. In this case, the terminals outside the coverage range of the network determine the sidelink configuration based on pre-configuration information and the information carried in sidelink broadcast channel (PSBCH) sent by a terminal within the coverage range of the network, and performs the sidelink communication.

Figure 2C:
FIG. 2c is a schematic diagram of sidelink communication out of a network coverage area.

As shown in FIG. 2c, for sidelink communication out of the coverage of the network, all terminals performing the sidelink communication are located outside the coverage range of the network, and all the terminals determine the sidelink configuration according to pre-configuration information to perform the sidelink communication.

With regard to D2D/V2X, there are two transmission modes in 3GPP: a first mode and a second mode.

The first mode: a transmission resource of a terminal is allocated by a base station. The terminal sends data on a sidelink according to the resource allocated by the base station. The base station may allocate the resource to the terminal for a single transmission, or may allocate the resource to the terminal for a semi-persistent transmission. As shown in FIG. 2a, the terminal is located within the coverage range of the network, and the network allocates the transmission resource used for the sidelink transmission to the terminal.

The second mode: a terminal selects one resource in a resource pool for data transmission. As shown in FIG. 2c, the terminal is located outside the coverage range of the cell, and the terminal selects a transmission resource independently in a pre-configured resource pool for a sidelink transmission. Or, as shown in FIG. 2a, the terminal selects a transmission resource independently in a resource pool configured by the network for a sidelink transmission.

In the NR-V2X, the automatic driving needs to be supported, thus higher requirements are put forward for data interaction between vehicles, such as a greater throughput, a lower delay, a higher reliability, a larger coverage range, and a more flexible resource allocation, etc.

Figure 3A:
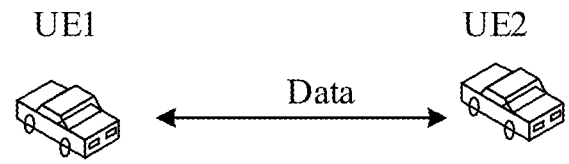
FIG. 3a is a schematic diagram of a unicast transmission.
Figure 3B:
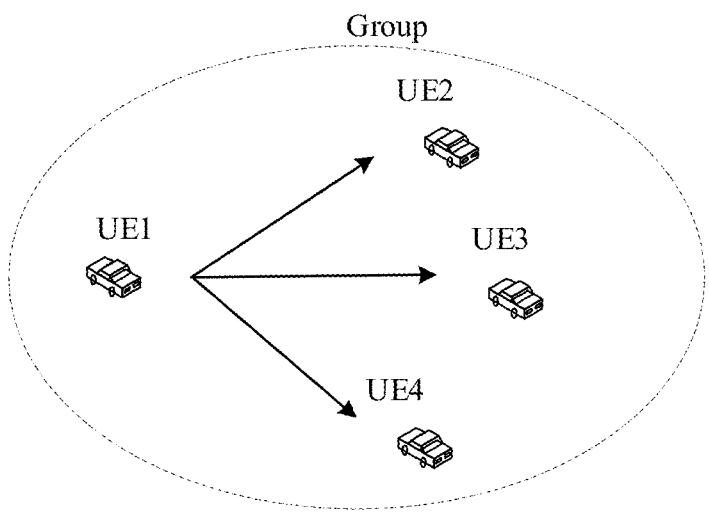
FIG. 3b is a schematic diagram of a multicast transmission.
Figure 3C:
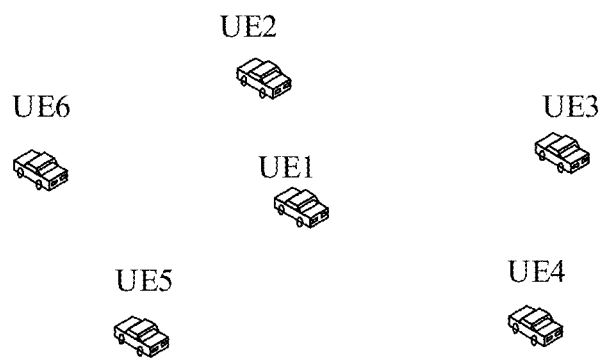
FIG. 3c is a schematic diagram of a broadcast transmission.

In LTE-V2X, a broadcast transmission mode is supported, and in NR-V2X, unicast and multicast transmission modes are introduced. In the unicast transmission, there is only one terminal at a receiving end. As shown in FIG. 3a, the unicast transmission is carried out between UE1 and UE2. In the multicast transmission, at the receiving end, there are all terminals in a communication group or all terminals within a certain transmission distance. As shown in FIG. 3b, UE1, UE2, UE3 and UE4 constitute a communication group in which UE1 sends data, and other terminal devices in the group are all terminals of the receiving end. In the broadcast transmission mode, the terminal of the receiving end is any terminal around the terminal of a sending end. As shown in FIG. 3c, UE1 is the terminal of the sending end, and other terminals around the UE1, UE2-UE6 are all terminals of the receiving end.

A two-stage Sidelink Control Information (SCI) mechanism in NR-V2X is described below:

The two-stage SCI is introduced into NR-V2X. The first-stage SCI is carried in Physical Sidelink Control Channel (PSCCH) and is used to indicate a transmission resource, pre-reserved resource information, a Modulation and Coding Scheme (MCS) level, a priority and other information of Physical Sidelink Shared Channel (PSSCH). The second-stage SCI is sent in resources of the PSSCH and demodulated by using Demodulation Reference Signal (DMRS) of the PSSCH, which is used for indicating information for data demodulation, such as a sending end Identification (ID), a receiving end ID, a Hybrid Automatic Repeat ReQuest (HARQ) ID, and a New Data Indicator (NDI). The second-stage SCI is mapped from the first DMRS symbol of PSSCH, first in frequency domain and then in time domain. As shown in FIG. 4, the PSCCH occupies three symbols (symbols 1, 2 and 3), the DMRS of PSSCH occupies symbols 4 and 11, and the second-stage SCI is mapped from symbol 4 and frequency-division multiplexed with DMRS on symbol 4. The second-stage SCI is mapped to symbols 4, 5 and 6, and the size of the resources occupied by the second-stage SCI depends on the quantity of bits of the second-stage SCI.

Resource allocation can be enhanced in NR-V2X. For example, in the transmission way of the second mode, the terminal randomly selects a transmission resource in a resource pool or selects a transmission resource according to a sensing result. This resource selection method can avoid interference between terminals to a certain extent, but the following problems still exist.

Hidden node: As shown in FIG. 5, terminal B selects a resource according to sensing, and uses the resource to send sidelink data to terminal A (receiving end, RX). Since terminal B (sending end, TX) and terminal C (sending end, TX) are far away from each other and cannot sense each other's transmission, terminal B and terminal C may select the same transmission resource, so the data sent by terminal C will cause interference to the data sent by terminal B, which is the problem of hidden node.

Half-duplex problem: when a terminal selects a transmission resource through sensing, in a sensing window, if the terminal sends sidelink data in a certain slot, due to the limitation of half-duplex, the terminal cannot receive data sent by other terminals in that slot, and there is also no sensing result. Therefore, when the terminal performs resource exclusion, all the resources corresponding to the slots in a selection window will be excluded to avoid interference with other terminals. Due to the limitation of half duplex, the terminal excludes many resources that do not need to be excluded.

Power consumption problem: in the above sensing process, the terminal needs to continuously sensing resources to determine which resources are available. However, a lot of energy needs to be consumed for the terminal to continuously sense the resources. This is not a problem for a vehicle terminal, as the vehicle terminal has a power supply device. However, for a handheld terminal, excessive energy consumption will cause the terminal to run down soon. Therefore, how to reduce the energy consumption of the terminal is also a problem to be considered in the process of resource selection.

For the resource selection process of the second mode described above, an enhanced resource selection scheme is proposed. Based on the above method, a resource set can be sent from one terminal (UE1) to another terminal (UE2) for resource selection by UE2. The resource set can be, for example, the following information.

Resource set: this resource set is an available resource set. The UE1 obtains the available resource set according to a sensing result and sends the resource set to the UE2. When the UE2 selects a resource for sidelink data sent to the UE1, the UE2 can select the resource from the available resource set, thereby improving the reliability of receiving the sidelink data by the UE1. Alternatively, the resource set can be an unavailable resource set. UE1 reports the resource set to UE2, and UE2 avoids selecting a resource in the resource set when performing resource selection.

Specific transmission resource: the information sent by UE1 to UE2 includes a specific transmission resource. UE2 sends sidelink data to UE1 using the transmission resource. At this time, it is equivalent to UE1 allocating the sidelink transmission resource to UE2.

Compared with the method in which the terminal selects the transmission resource independently in the second mode, in the above resource allocation way, when performing the resource selection process, the terminal needs to take into consideration the resource set sent by other terminals, so that the transmission reliability can be improved.

In the enhanced resource selection scheme described above, one terminal UE1 may send a resource set to another terminal UE2, to assist the resource selection of the UE2.

Moreover, the terminal needs to determine or indicate a time-frequency domain location of the resource set.

FIG. 6 is a schematic flowchart of a transmission method 200 of a resource set according to an implementation of the present application. The method may optionally be applied to the system shown in FIG. 1 to FIG. 3c, but is not limited thereto. The method includes at least portion of following contents.

In act S210, a first terminal sends a transmission resource set to a second terminal, and a transmission resource included in the transmission resource set belongs to transmission resources in a first time-frequency range.

Exemplarily, in sidelink communication, the first terminal may sent to the second terminal a transmission resource set, the transmission resources in the transmission resource set belonging to the first time-frequency range, and the second terminal determines a transmission resource for sending sidelink data to the first terminal according to the transmission resource set.

Optionally, the first time-frequency range includes a starting location of a time domain and/or an ending location of a time domain. Exemplarily, locations of the time domain in the first time-frequency range may include a starting location of the time domain and/or an ending location of the time domain. For example, the first time-frequency range includes a starting location of a time window and/or an ending location of the time window.

Optionally, the starting location of the time domain and/or the ending location of the time domain are determined based on first indication information sent by the first terminal. Exemplarily, the first terminal may send the first indication information to the second terminal while sending the transmission resource set to the second terminal, the first terminal and the second terminal may determine the starting location and/or the ending location of the time domain included in the first time-frequency range through the first indication information.

Optionally, the first indication information is carried in Sidelink Control Information (SCI), Media Access Control (MAC) Control Element (CE), MAC Protocol Data Unit (PDU) or PC5-Radio Resource Control (RRC) signaling.

Optionally, the first indication information and the transmission resource set are carried in the same sidelink channel. Exemplarily, the first terminal may send the transmission resource set and the first indication information to the second terminal through the same sidelink channel.

Optionally, the starting location of the time domain and/or the ending location of the time domain are determined based on a location of a slot in which the sidelink channel carrying the transmission resource set is located. Exemplarily, if the first terminal sends the transmission resource set to the second terminal in slot n through a sidelink channel, the starting location and/or ending location of the time domain included in the first time-frequency range may be determined according to the slot n.

Optionally, the starting location of the time domain and/or the ending location of the time domain are determined based on the location of the slot in which the sidelink channel carrying the transmission resource set and a time length corresponding to a terminal processing capability. Exemplarily, if the first terminal sends the transmission resource set to the second terminal in slot n through a sidelink channel, the time length determined according to the terminal processing capability is k, the starting location of the time domain included in the first time-frequency range may be slot n+k. Then, based on a length of the time domain and the starting location of the time domain, the ending location of the time domain can be determined.

Exemplarily, if the first terminal sends the transmission resource set to the second terminal in slot n through a sidelink channel, the time length determined according to the terminal processing capability is k, the quantity of corresponding slots is k/T, where T represents a time length corresponding to one slot. The starting location of the time domain included in the first time-frequency range may be the first available slot after slot n+k/T. For example, k=0.2 ms, T=1 ms, n=1, then the starting location of the time domain included in the first time-frequency range may be the first available slot after slot 1+0.2/1, namely slot 2.

Optionally, the time length corresponding to the terminal processing capability is expressed by a quantity of time domain symbols.

Optionally, the time length corresponding to the terminal processing capability is determined according to a sub-carrier spacing of a bandwidth part in which the sidelink channel carrying the transmission resource set is located.

Optionally, the time length corresponding to the terminal processing capability includes:
 a time length corresponding to a terminal processing delay;
 a time length corresponding to a terminal processing time.

Optionally, the starting location of the time domain and/or the ending location of the time domain are determined based on the location of the slot in which the sidelink channel carrying the transmission resource set is located and a time offset.

Optionally, the time offset is determined based on at least one of the following:
 pre-configuration information;
 network configuration information;
 resource pool configuration information;
 second indication information of the first terminal.

Exemplarily, the first terminal may send the second indication information to the second terminal, and the second indication information carries the time offset, the first terminal or the second terminal may determine the starting location of the time domain and/or the ending location of the time domain included in the first time-frequency range based on the location of the slot in which the sidelink channel of the transmission resource set is located and the time offset.

Optionally, the starting location of the time domain and/or the ending location of the time domain are determined based on third indication information of the second terminal.

Optionally, the third indication information includes time domain location indication information, and the time domain location indication information includes the starting location of the time domain and/or the ending location of the time domain.

Exemplarily, the second terminal sends the third indication information to the first terminal via SCI, MAC CE, MAC PDU or PC5-RRC signaling, the indication information is used to indicate the starting location and/or the ending location of the time domain. The first terminal determines a resource set in a time range specified by the second terminal and transmits the resource set to the second terminal.

Optionally, the third indication information includes indication information of a resource selection window, the indication information of the resource selection window including at least one of the following:
 a starting location of the resource selection window;
 an ending location of the resource selection window.

In an implementation of the present application, the resource selection window may be used for the terminal to determine a time domain range when performing resource selection; all resources selected by the terminal are the resources in the resource selection window.

Optionally, the starting location of the time domain is determined according to the starting location of the resource selection window.

Optionally, the ending location of the time domain is determined according to the ending location of the resource selection window.

Optionally, the third indication information includes information of a resource reservation period. Exemplarily, the first terminal may determine the location of the time domain according to the reservation period P. For example, the time window is [n, n+P], or the time window is [n+P, n+2P−1], where n may be determined based on the first indication information sent by the first terminal, or n may be the location of the slot corresponding to the sidelink channel through which the transmission resource set are sent by the first terminal to the second terminal.

Optionally, the starting location of the time domain and/or the ending location of the time domain are determined based on the resource reservation period and the location of a slot in which the sidelink channel carrying the third indication information is located. Exemplarily, the first terminal may determine the location of the time domain according to the reserved period P and a location m of slot in which the second terminal sends data. For example, the time window is [m+P, m+2P−1], where m may be the location of the slot corresponding to sending the third indication information by the second terminal.

Optionally, the starting location of the time domain and/or the ending location of the time domain are determined based on the resource reservation period, a reserved slot of the second terminal and the location of the slot in which the sidelink channel carrying the third indication information is located. Exemplarily, the location of the time domain is determined according to the reserved period P, the reserved slots m+b and m+a of the second terminal, and the location m of slot in which the second terminal sends data, and the first terminal may determine the ending location of the time window in which the resource set is located as slot m+P+a, m+2P or m+2P−1.

Optionally, the starting location of the time domain and/or the ending location of the time domain are determined based on a length of the time domain. For example, based on the starting location of the time window and the length of the time window, the ending location of the time window may be determined. Based on the ending location of the time window and the length of the time window, the starting location of the time window can be determined.

Optionally, the length of the time domain is determined based on at least one of the following:
pre-configuration information;
a protocol stipulation;
network configuration information;
resource pool configuration information;
fourth indication information of the second terminal.

For example, the length of the time window is determined through the pre-configuration information, the protocol stipulation, the network configuration information, the resource pool configuration information, or the indication information from the second terminal.

Optionally, the fourth indication information includes a Packet Delay Budget (PDB), the length of the time domain is determined based on the PDB. Herein, the PDB is used to indicate a delay requirement of a data packet.

Exemplarily, the fourth indication information sent by the second terminal to the first terminal may include PDB=20 ms, which corresponds to 20 slots at 15 kHz sub-carrier spacing. If the starting location of the time domain determined by the first terminal or the second terminal is slot n, the ending location of the time domain determined according to the fourth indication information is slot n+19, and the range of the time domain is the slots [n, n+19].

Optionally, the fourth indication information includes a time length or a quantity of slots, and the length of the time domain is determined based on the time length or the quantity of slots.

Optionally, the fourth indication information includes an index value, and the length of the time domain is determined based on the index value and a first corresponding relationship.

Optionally, the first corresponding relationship is pre-configured, network configured, or determined based on fifth indication information of the second terminal.

Exemplarily, the first corresponding relationship may include a corresponding relationship between the index value and the quantity of slots. After receiving the index value from the second terminal, the first terminal can search for the quantity of slots corresponding to the index value in the first corresponding relationship, so as to determine the length of the time domain.

Optionally, the first time-frequency range includes a starting location of the frequency domain and/or an ending location of the frequency domain.

Optionally, the starting location of the frequency domain and/or the ending location of the frequency domain are determined based on resource pool configuration information.

Optionally, the resource pool configuration information includes at least one of the following:
an index of an initial sub-channel, a size of a sub-channel and a quantity of sub-channels of the resource pool.

Optionally, the starting location of the frequency domain and/or the ending location of the frequency domain are determined based on sixth indication information of the second terminal.

For example, the second terminal sends the sixth indication information to the first terminal via SCI, MAC CE, MAC PDU or PC5-RRC signaling, and the indication information is used to indicate the starting location and/or the ending location of the frequency domain. The first terminal determines a resource set within the frequency domain specified by the second terminal and sends the resource set to the second terminal.

Optionally, the sixth indication information includes the resource pool configuration information.

Optionally, the sixth indication information includes the starting location of the frequency domain and the ending location of the frequency domain.

Optionally, the sixth indication information includes the starting location of the frequency domain and a length of the frequency domain; the ending location of the frequency domain is determined by the first terminal based on the starting location of the frequency domain and the length of the frequency domain. Exemplarily, the ending location of the frequency domain may be equal to the starting location of the frequency domain plus the length of the frequency domain.

Optionally, the sixth indication information includes the ending location of the frequency domain and a length of the frequency domain; the starting location of the frequency domain is determined by the first terminal based on the ending location of the frequency domain and the length of the frequency domain. Exemplarily, the starting location of the frequency domain may be equal to the ending location of the frequency domain minus the length of the frequency domain.

Optionally, the sixth indication information includes the starting location of the frequency domain; the ending location of the frequency domain is determined by the first terminal based on the starting location of the frequency domain and a length of the frequency domain. Exemplarily, the first terminal may obtain the length of the frequency domain by means of pre-configuration information, network configuration information or a protocol stipulation or other methods after receiving the starting location of the frequency domain, and then obtain the ending location of the frequency domain by adding the length of the frequency domain to the starting location of the frequency domain.

Optionally, the sixth indication information includes the ending location of the frequency domain; the starting location of the frequency domain is determined by the first terminal based on the ending location of the frequency domain and the length of the frequency domain. Exemplarily, after receiving the ending location of the frequency domain, the first terminal can obtain the length of the frequency domain by means of pre-configuration information, network configuration information or a protocol stipulation or other methods, and then obtain the starting location of the frequency domain by subtracting the length of the frequency domain from the ending location of the frequency domain.

Optionally, the length of the frequency domain is determined based on at least one of the following:
the pre-configuration information;
the protocol stipulation;
the network configuration information.

Optionally, the starting location of the frequency domain and/or the ending location of the frequency domain are determined based on the pre-configuration information or the protocol stipulation.

Exemplarily, the first terminal determines the starting location and/or the ending location of the frequency domain included in the first time-frequency range based on the pre-configuration information or the protocol stipulation, and then determines the transmission resource set based on the starting location and/or the ending location of the frequency domain and sends the transmission resource set to the second terminal. The second terminal may determine a transmission resource for sending sidelink data to the first terminal according to the transmission resource set.

The method of the implementation of the application can accurately determine the time-frequency range of the transmission resource set, so that the sending end and the receiving end of the resource set can determine the same time-frequency range, and can further determine the time-frequency locations corresponding to the transmission resources in the resource set, and carry out correct resource selection according to the transmission resources in the resource set.

FIG. 7 is a schematic flowchart of a transmission method 300 of a resource set according to another implementation of the present application. The method may optionally be applied to any one of the systems shown in FIG. 1 to FIG. 3c, but is not limited thereto. The method includes at least portion of following contents.

In act 5310, a second terminal receives a transmission resource set from a first terminal, wherein a transmission resource included in the transmission resource set belongs to transmission resources in a first time-frequency range.

Optionally, the first time-frequency range includes a starting location of a time domain and/or an ending location of a time domain.

Optionally, the starting location of the time domain and/or the ending location of the time domain are determined based on first indication information from the first terminal.

Optionally, the first indication information is carried in SCI, MAC CE, MAC PDU or PC5-RRC signaling.

Optionally, the first indication information and the transmission resource set are carried in the same sidelink channel.

Optionally, the starting location of the time domain and/or the ending location of the time domain are determined based on a location of a slot in which the sidelink channel carrying the transmission resource set is located.

Optionally, the starting location of the time domain and/or the ending location of the time domain are determined based on the location of the slot in which the sidelink channel carrying the transmission resource set and a time length corresponding to a terminal processing capability.

Optionally, the time length corresponding to the terminal processing capability is expressed by a quantity of time domain symbols.

Optionally, the time length corresponding to the terminal processing capability is determined according to a sub-carrier spacing of a bandwidth part in which the sidelink channel carrying the transmission resource set is located.

Optionally, the time length corresponding to the terminal processing capability includes:
a time length corresponding to a terminal processing delay;
a time length corresponding to a terminal processing time.

Optionally, the starting location of the time domain and/or the ending location of the time domain are determined based on the location of the slot in which the sidelink channel carrying the transmission resource set is located and a time offset.

Optionally, the time offset is determined based on at least one of the following: pre-configuration information, network configuration information, resource pool configuration information, second indication information of the first terminal.

Exemplarily, the first terminal may send the second indication information to the second terminal, the second indication information carries the time offset, the first terminal or the second terminal may determine the starting location of the time domain and/or the ending location of the time domain included in the first time-frequency range based on the location of the slot in which the sidelink channel of the transmission resource set is located and the time offset.

Optionally, the starting location of the time domain and/or the ending location of the time domain are determined based on third indication information of the second terminal.

Optionally, the third indication information includes time domain location indication information, and the time domain location indication information includes the starting location of the time domain and/or the ending location of the time domain.

Optionally, the third indication information includes indication information of a resource selection window, the indication information of the resource selection window including at least one of the following:
a starting location of the resource selection window;
an ending location of the resource selection window.

Optionally, the starting location of the time domain is determined according to the starting location of the resource selection window.

Optionally, the ending location of the time domain is determined according to the ending location of the resource selection window.

Optionally, the third indication information includes information of a resource reservation period.

Optionally, the starting location of the time domain and/or the ending location of the time domain are determined based on the resource reservation period and the location of the slot in which the sidelink channel carrying the third indication information is located.

Optionally, the starting location of the time domain and/or the ending location of the time domain are determined based on a resource reservation period, a reserved slot of the second terminal and the location of the slot in which the sidelink channel carrying the third indication information is located.

Optionally, the starting location of the time domain and/or the ending location of the time domain are determined based on a length of the time domain.

Optionally, the length of the time domain is determined based on at least one of the following: pre-configuration information, a protocol stipulation, network configuration information, resource pool configuration information; or fourth indication information of the second terminal.

Optionally, the fourth indication information includes a packet delay budget (PDB), the length of the time domain is determined based on the PDB.

Optionally, the fourth indication information includes a time length or a quantity of slots, and the length of the time domain is determined based on the time length or the quantity of slots.

Optionally, the fourth indication information includes an index value, and the length of the time domain is determined based on the index value and a first corresponding relationship.

Optionally, the first corresponding relationship is pre-configured, network configured, or determined based on fifth indication information of the second terminal.

Optionally, the first time-frequency range includes a starting location of a frequency domain and/or an ending location of the frequency domain.

Optionally, the starting location of the frequency domain and/or the ending location of the frequency domain are determined based on resource pool configuration information.

Optionally, the resource pool configuration information includes at least one of the following:

an index of an initial sub-channel, a size of a sub-channel and a quantity of sub-channels of the resource pool.

Optionally, the starting location of the frequency domain and/or the ending location of the frequency domain are determined based on sixth indication information of the second terminal.

Optionally, the sixth indication information includes the resource pool configuration information.

Optionally, the sixth indication information includes the starting location of the frequency domain and the ending location of the frequency domain.

Optionally, the sixth indication information includes the starting location of the frequency domain and a length of the frequency domain;

the ending location of the frequency domain is determined by the second terminal based on the starting location of the frequency domain and the length of the frequency domain.

Optionally, the sixth indication information includes the ending location of the frequency domain and a length of the frequency domain;

the starting location of the frequency domain is determined by the second terminal based on the ending location of the frequency domain and the length of the frequency domain.

Optionally, the sixth indication information includes the starting location of the frequency domain;

the ending location of the frequency domain is determined by the second terminal based on the starting location of the frequency domain and a length of the frequency domain.

Optionally, the sixth indication information includes the ending location of the frequency domain;

the starting location of the frequency domain is determined by the second terminal based on the ending location of the frequency domain and a length of the frequency domain.

Optionally, the length of the frequency domain is determined based on at least one of the following: pre-configuration information; a protocol stipulation; network configuration information.

Optionally, the starting location of the frequency domain and/or the ending location of the frequency domain are determined based on pre-configuration information or a protocol stipulation.

Specific principle and examples of the method 300 performed by the second terminal in the implementation may be referred to related descriptions about the second terminal in the above method 200, which will not be repeated here for brevity.

The transmission method of the resource set of the present application is described below by specific examples.

Figure 8:
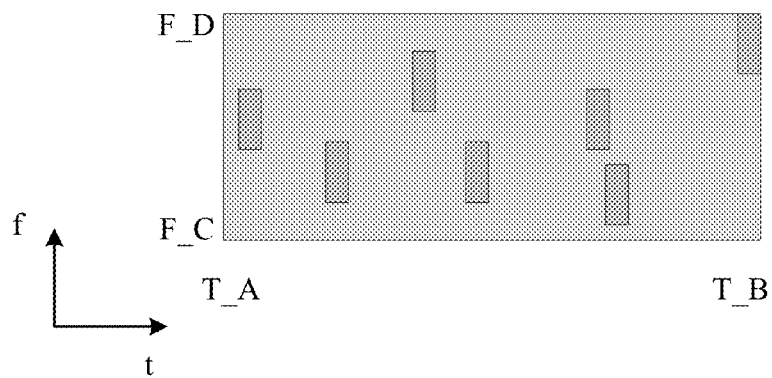
FIG. 8 is a schematic diagram of a time-frequency range.

Suppose UE1 sends to UE2 a transmission resource set (a resource set for short), which is resources within a time range [T_A, T_B] and a frequency domain range [F_C, F_D], as shown in FIG. 8. When UE1 sends the resource set to UE2, both UE1 and UE2 need to have the same understanding of the resource set, and can determine that the resource set is transmission resources belonging to the time range [T_A, T_B] and the frequency domain range [F_C, F_D], that is, both UE1 and UE2 can determine T_A, T_B, F_C and F_D. Herein, T_A and T_B represent a time domain location or a slot index corresponding to the time domain location; F_C and F_D represent a frequency domain location, such as Physical Resource Block (PRB) index or sub-channel index.

The following are several examples of the methods for determining the starting location T_A and the ending location T_B of the time window.

Example 1: The starting location T_A and/or ending location T_B of the time window is sent to UE2 by UE1.

For example, when UE1 sends the resource set to UE2, information determining the time location T_A or T_B may be simultaneously sent to UE2, so that UE1 and UE2 may determine the same T_A and T_B.

Specifically, the indication information for determining T_A or T_B may be carried by SCI, MAC CE, MAC PDU, PC5-RRC signaling or the like.

Example 2: The starting location T_A of the time window is determined by a location of a slot in which the UE1 sends the sidelink channel carrying the resource set.

For example, when UE1 sends the resource set to UE2, the resource set is carried on a sidelink channel, such as carried in an SCI, a PC5-RRC, a MAC CE, or a MAC PDU. UE1 sends indication information of the resource set in slot n, and both UE1 and UE2 can determine time location T_A according to slot n.

For another example, the time location T_A may be the kth slot after slot n, i.e. slot n+k, where k is an integer greater than or equal to 1.

Optionally, k may be determined from pre-configuration information, network configuration information, resource pool configuration information, indication information of UE2. Or, k can be a fixed value. Or, k may be determined according to a processing capability of the terminal, referring to example 5 below. If a processing delay or preparation time of the terminal is Tproc, the time location T_A is the first available slot after the time location Tn+Tproc, or Tn+1+Tproc. Tn and Tn+1 represent time locations corresponding to slot n and slot n+1 respectively, and Tproc may be expressed without the unit of slot, for example, may be expressed by the unit of time domain symbol.

Figure 9:
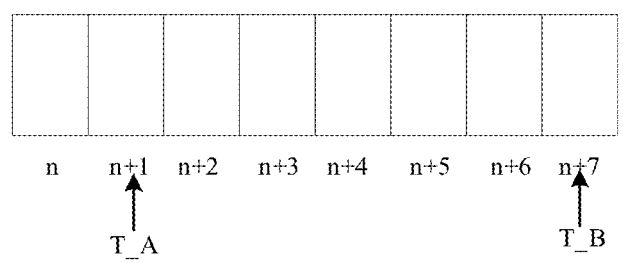
FIG. 9 is a schematic diagram of an example of determining a time range.

As shown in FIG. 9 UE1 sends a sidelink channel to UE2 in slot n, and the sidelink channel includes a resource set. Slot n is the location of the slot in which the sidelink channel carrying the resource set is located. If k=1 in a protocol stipulation, the starting location of the time window in which the resource set is located can be determined as slot n+1 according to slot n. If the length of the time window is 7 slots, then the ending location of the time window can further be determined as slot n+7.

Further, if the length T_L of the time window is determinable, the ending location T_B of the time window may be determined according to the starting location T_A and T_L of the time window, for example, T_B=T_A+T_L; or, the starting location T_A of the time window may be determined according to the ending location T_B and T_L of the time window, for example, T_A=T_B−T_L.

Example 3: The starting location T_A and/or ending location T_B of the time window is determined by information sent to UE1 by UE2.

Example 3-1: UE2 sends information to UE1, including information for determining the starting location T_A of the time window.

Example 3-1-1: the indication information includes time domain location indication information, and the time domain location indication information is used for determining the starting location T_A and/or the ending location T_B of the time window.

Figure 10:
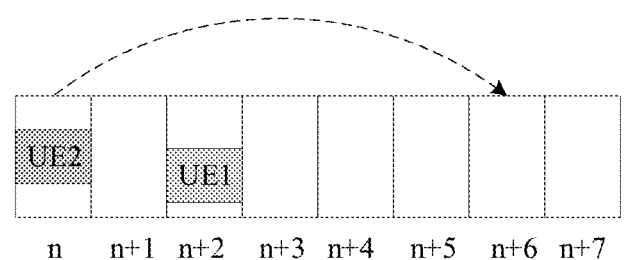
FIG. 10 is a schematic diagram of another example of determining a time range.

For example, as shown in FIG. 10, UE2 sends indication information to UE1 in slot n, the indication information is used for determining that the starting location T_A of the time window is slot n+6, and UE1 sends the resource set to UE2 in slot n+2, the starting location of the time window of the resource set is slot n+6.

Example 3-1-2: the indication information includes indication information of a resource selection window, the UE1 determines the starting location T_A and/or the ending location T_B of the time window according to the indication information of the resource selection window.

Figure 11:
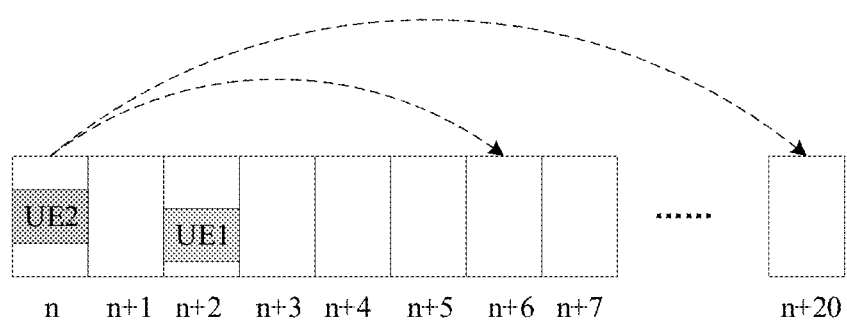
FIG. 11 is a schematic diagram of another example of determining a time range.

For example, as shown in FIG. 11, UE2 sends indication information to UE1 in slot n, the indication information is used for determining that the starting location of the resource selection window is slot n+6 and the ending location is slot n+20. The UE1 sends the resource set to the UE2 in the slot n+2, and the resources in the resource selection window of the resource set, i.e. the starting location T_A of the time window is the slot n+6, and the ending location T_B is the slot n+20.

Example 3-1-3: the indication information includes indication information of a resource reservation period of the UE2, the starting location T_A and/or the ending location T_B of the time window are determined according to the indication information.

For example, when UE2 sends sidelink data, the indication information of the resource reservation period P is carried in SCI, the indication information is used to indicate that UE2 reserves transmission resources after period P, and when UE1 sends the resource set to UE2, the resource set is used to assist UE2 in resource selection. Therefore, the starting location of the time window of the resource set can be determined according to the period parameter P. For example, UE2 sends sidelink data in slot n, and the indication information of the resource reservation carried in SCI is P=10, that is, transmission resources after 10 slots are reserved, corresponding to slot n+10. UE1 sends to UE2 the resource set, the resource set is transmission resources within the time window [T_A, T_B], the starting location T_A of the time window is, for example, slot n+10, or, slot n+10−k, where k is an integer.

Further, the ending location T_B of the time window can be determined.

For example, when UE2 sends sidelink data in slot n, the SCI carries the resource reservation period P, and the SCI indicates that resources in slot n+a are reserved, or that resources in slot n+b and slot n+a are reserved. Suppose one SCI can indicate up to 3 resources (i.e. slot n, slot n+b, slot n+a), slot n+a is located after slot n+b. According to the period P, UE2 simultaneously reserves transmission resources after one period, that is, the resources in slots n+P, n+P+b and n+P+a. When UE1 sends the resource set to UE2, the ending location of the time window in which the resource set is located can be determined as slot n+P+a, n+2P or n+2P−1.

Figure 12:
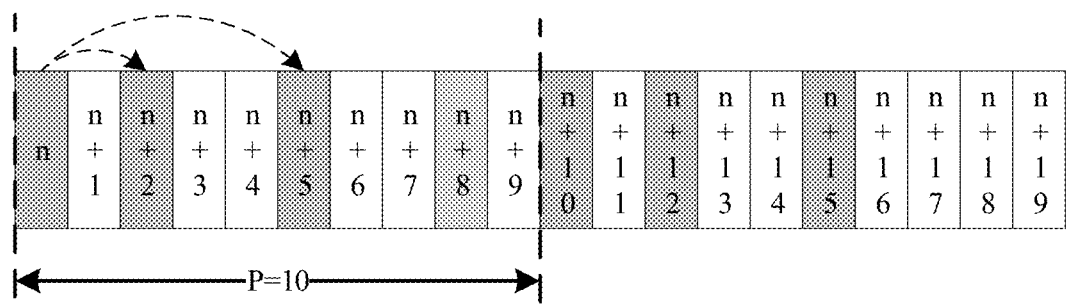
FIG. 12 is a schematic diagram of another example of determining a time range.

As shown in FIG. 12, UE2 sends sidelink data in slot n, in SCI, it is indicated that resources of slots n+2, n+5 are reserved, and the resource reservation period P=10, which can, in this way, represent that resources in the next cycle, i.e. transmission resources in slots n+10, n+12 and n+15, are reserved at the same time. UE1 sends the resource set to UE2 in slot n+8. The resources in the resource set may be transmission resources located within slots [n+10, n+20], or may be transmission resources located within slots [n+10, n+19], or may be transmission resources located within slots [n+10, n+15].

Example 4: The length T_L of the time window is obtained, and the ending location T_B of the time window is determined according to the starting location T_A of the time window, or the starting location T_A of the time window is determined according to the ending location T_B of the time window.

Example 4-1: The length of the time window can be pre-configured or specified by a protocol. For example, the length of the time window is 100 ms, 100 slots or 32 slots, etc.

Example 4-2: The length of the time window can be configured by the network. For example, the network configures this parameter through System Information Block (SIB) information or RRC signaling.

Example 4-3: The length of the time window is a resource pool configuration parameter. For example, in a pre-configured or network-configured resource pool, a parameter for determining the length of the time window is included.

For example, the parameter T_L for the length of the time window is included in the resource pool configuration information, and the length of the time window can be determined according to this parameter.

For another example, a set of available resource reservation period parameters {P1, P2, P3, . . . } is included in the resource pool configuration information, and the length of the time window is determined according to the set. For example, the length of the time window is the minimum or maximum value in the set.

Example 4-4: The length of the time window can be determined according to information sent by UE2.

For example, UE2 sends information to UE1, the information includes a packet delay budget (PDB), the length of the time window is determined according to the PDB. The way of determination can be T_B=T_A+T_PDB.

For another example, the UE2 sends information to the UE1, and the information is used for indicating a time length or a quantity of slots. The length of the time window is determined according to the time length or the quantity of slots.

For another example, the information sent by the UE2 includes an index value, and the length of the time window is determined according to the index value and a first corresponding relationship. Herein the first corresponding relationship is a corresponding relationship between the index value and the length of the time window. The first corresponding relationship can be pre-configured, network configured, or sent from UE1 to UE2, or sent from UE2 to UE1 when UE1 and UE2 establish a communication link.

Example 5: On the basis of the above example, the starting location T_A and/or the ending location T_B of the time window are further determined according to a processing delay or a processing time of the terminal.

For example, the starting location T_A of the time window may be determined according to the slot n in which the UE1 sends the resource set. For example, T_A=T_n+T_k, k represents the quantity of slots, T_k represents the time length corresponding to k slots, and T_n represents the time location corresponding to slot n. Since the processing time T_proc is required for UE2 to receive the sidelink channel transmitting the resource set, the starting location of the time window determined by the terminal further needs to be determined according to T_proc. For example, T_A=T_n+ max (T_k, T_proc).

The following are several examples of the method for determining a starting location F_C of the frequency domain and an ending location F_D of the frequency domain.

Example 6: Determining the location range of the frequency domain F_C and/or F_D of the transmission resource set according to resource pool configuration information.

The UE1 acquires the resource pool configuration information and determines the starting location F_C and/and the ending location F_D of the frequency domain corresponding to the resource pool according to the resource pool configuration information.

The resource pool configuration information includes the index of the initial sub-channel, the size of the sub-channel and the quantity of the sub-channels of the resource pool. The starting location and ending location of frequency domain of the resource pool can be determined according to these three parameters.

Example 7: Determining the location range of the frequency domain according to the information of UE2.

The UE2 sends indication information to the UE1, and the UE1 determines the starting location and/or the ending location of the frequency domain according to the indication information.

For example, when UE1 determines the resource set, it can be determined by sensing. Since the resource set is used for UE2 to select a resource, UE1 can perform sensing in the sending resource pool of UE2 when sensing for resources. Therefore, UE2 needs to send information of the sending resource pool to UE1. Thus the UE1 can determine the starting location and the ending location of the frequency domain resource in the manner of example 6.

For another example, the UE2 sends indication information to the UE1, and the indication information is used for determining the starting location and the ending location of the frequency domain. The UE1 can determine the starting location and the ending location of the frequency domain according to the indication information.

For another example, the UE2 sends indication information to the UE1, and the indication information is used for determining the starting location of the frequency domain and the length of the frequency domain. The UE1 can determine the starting location and the ending location of the frequency domain according to the indication information. The length of the frequency domain is, for example, the quantity of PRBs or the quantity of sub-channels.

For another example, the UE2 sends indication information to the UE1, and the indication information is used for determining the starting location of the frequency domain. The UE1 can determine the starting location of the frequency domain according to the indication information. Further, the UE1 determines the length of the frequency domain, and thus the ending location of the frequency domain can be determined. Herein the length of the frequency domain is determined by the UE1, including at least one of the following manners:

pre-configuration information;

a protocol stipulation;

network configuration information.

Example 8: Determining the location range of the frequency domain according to the pre-configuration information or the protocol stipulation. For example, the size or range of the frequency domain can be determined in the manner of the protocol stipulation.

In the above examples, the resource set sent to UE2 by UE1, or the indication information sent to UE1 by UE2, may be carried in SCI, PC5-RRC signaling, MAC CE, or MAC PDU.

In the implementations of the present application, the time domain location and the frequency domain location of the resource window of the transmission resource set sent by the sending end to the receiving end can be determined, so that the sending end and the receiving end of the resource set can determine the same time-frequency range.

Figure 13:
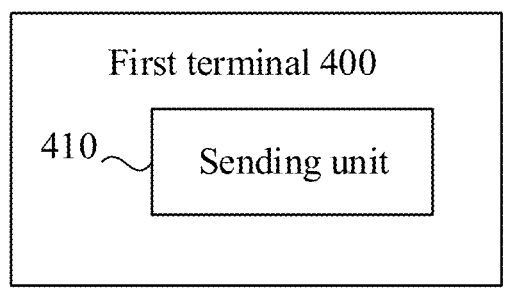
FIG. 13 is a schematic block diagram of a first terminal according to an implementation of the present application.

FIG. 13 is a schematic block diagram of a first terminal 400 according to an implementation of the present application. The first terminal 400 may include:

a sending unit 410, used for sending a transmission resource set to a second terminal, wherein a transmission resource included in the transmission resource set belongs to transmission resources in a first time-frequency range.

Optionally, the first time-frequency range includes a starting location of a time domain and/or an ending location of a time domain.

Optionally, the starting location of the time domain and/or the ending location of the time domain are determined based on first indication information sent by the first terminal.

Optionally, the first indication information is carried in SCI, MAC CE, MAC PDU or PC5-RRC signaling.

Optionally, the first indication information and the set of transmission resources are carried in the same sidelink channel.

Optionally, the starting location of the time domain and/or the ending location of the time domain are determined based on a location of a slot in which the sidelink channel carrying the transmission resource set is located.

Optionally, the starting location of the time domain and/or the ending location of the time domain are determined based on the location of the slot in which the sidelink channel carrying the transmission resource set and a time length corresponding to a terminal processing capability.

Optionally, the time length corresponding to the terminal processing capability is expressed by a quantity of time domain symbols.

Optionally, the time length corresponding to the terminal processing capability is determined according to a sub-carrier spacing of a bandwidth part in which the sidelink channel carrying the transmission resource set is located.

Optionally, the time length corresponding to the terminal processing capability includes:
- a time length corresponding to a terminal processing delay;
- a time length corresponding to a terminal processing time.

Optionally, the starting location of the time domain and/or the ending location of the time domain are determined based on the location of the slot in which the sidelink channel carrying the transmission resource set and a time offset.

Optionally, the time offset is determined based on at least one of the following:
- pre-configuration information;
- network configuration information;
- resource pool configuration information;
- second indication information of the first terminal.

Optionally, the starting location of the time domain and/or the ending location of the time domain are determined based on third indication information of the second terminal.

Optionally, the third indication information includes time domain location indication information, and the time domain location indication information includes the starting location of the time domain and/or the ending location of the time domain.

Optionally, the third indication information includes indication information of a resource selection window, and the indication information of the resource selection window includes at least one of the following:
- a starting location of the resource selection window;
- an ending location of the resource selection window.

Optionally, the starting location of the time domain is determined according to the starting location of the resource selection window.

Optionally, the ending location of the time domain is determined according to the ending location of the resource selection window.

Optionally, the third indication information includes information of a resource reservation period.

Optionally, the starting location of the time domain and/or the ending location of the time domain are determined based on the resource reservation period and a location of a slot in which the sidelink channel carrying the third indication information is located.

Optionally, the starting location of the time domain and/or the ending location of the time domain are determined based on the resource reservation period, a reserved slot of the second terminal and the location of the slot in which the sidelink channel carrying the third indication information is located.

Optionally, the starting location of the time domain and/or the ending location of the time domain are determined based on a length of the time domain.

Optionally, the length of the time domain is determined based on at least one of the following:
- pre-configuration information;
- a protocol stipulation;
- network configuration information;
- resource pool configuration information;
- fourth indication information of the second terminal.

Optionally, the fourth indication information includes a packet delay budget (PDB), the length of the time domain is determined based on the PDB.

Optionally, the fourth indication information includes a time length or a quantity of slots, and the length of the time domain is determined based on the time length or the quantity of slots.

Optionally, the fourth indication information includes an index value, and the length of the time domain is determined based on the index value and a first corresponding relationship.

Optionally, the first corresponding relationship is pre-configured, network configured, or determined based on fifth indication information of the second terminal.

Optionally, the first time-frequency range includes a starting location of the frequency domain and/or an ending location of the frequency domain.

Optionally, the starting location of the frequency domain and/or the ending location of the frequency domain are determined based on resource pool configuration information.

Optionally, the resource pool configuration information includes at least one of the following:
- an index of an initial sub-channel, a size of a sub-channel and a quantity of sub-channels of the resource pool.

Optionally, the starting location of the frequency domain and/or the ending location of the frequency domain are determined based on sixth indication information of the second terminal.

Optionally, the sixth indication information includes the resource pool configuration information.

Optionally, the sixth indication information includes the starting location of the frequency domain and the ending location of the frequency domain.

Optionally, the sixth indication information includes the starting location of the frequency domain and a length of the frequency domain;
- the ending location of the frequency domain is determined by the first terminal based on the starting location of the frequency domain and the length of the frequency domain.

Optionally, the sixth indication information includes the ending location of the frequency domain and a length of the frequency domain;
- the starting location of the frequency domain is determined by the first terminal based on the ending location of the frequency domain and the length of the frequency domain.

Optionally, the sixth indication information includes the starting location of the frequency domain;

the ending location of the frequency domain is determined by the first terminal based on the starting location of the frequency domain and a length of the frequency domain.

Optionally, the sixth indication information includes the ending location of the frequency domain;

the starting location of the frequency domain is determined by the first terminal based on the ending location of the frequency domain and a length of the frequency domain.

Optionally, the length of the frequency domain is determined based on at least one of the following:
pre-configuration information;
a protocol stipulation;
network configuration information.

Optionally, the starting location of the frequency domain and/or the ending location of the frequency domain are determined based on the pre-configuration information or the protocol stipulation.

The first terminal 400 of the implementation of the present application can realize the corresponding function of the first terminal in the aforementioned method implementations. The flow, function, implementation mode and beneficial effect corresponding to each module (sub-module, unit or component, etc.) in the first terminal 400 can be referred to the corresponding description in the above method implementations, and will not be repeated here. It should be noted that the functions described with respect to each module (sub-module, unit, component, etc.) in the first terminal 400 of the implementation of the present application may be realized by different modules (sub-module, unit, component, etc.) or by the same module (sub-module, unit, component, etc.).

Figure 14:
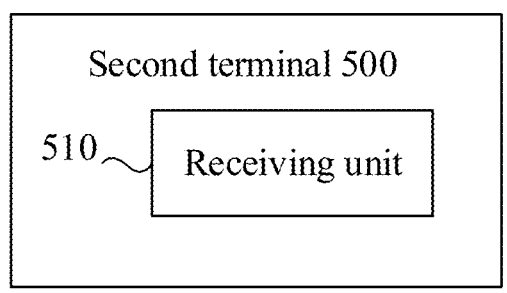
FIG. 14 is a schematic block diagram of a second terminal according to an implementation of the present application.

FIG. 14 is a schematic block diagram of a second terminal 500 according to an implementation of the present application. The second terminal 500 may include:
a receiving unit 510, used for receiving a transmission resource set from a first terminal, wherein a transmission resource included in the transmission resource set belongs to transmission resources in a first time-frequency range.

Optionally, the first time-frequency range includes a starting location of a time domain and/or an ending location of a time domain.

Optionally, the starting location of the time domain and/or the ending location of the time domain are determined based on first indication information from the first terminal.

Optionally, the first indication information is carried in SCI, MAC CE, MAC PDU or PC5-RRC signaling.

Optionally, the first indication information and the transmission resource set are carried in the same sidelink channel.

Optionally, the starting location of the time domain and/or the ending location of the time domain are determined based on a location of a slot in which the sidelink channel carrying the transmission resource set is located.

Optionally, the starting location of the time domain and/or the ending location of the time domain are determined based on the location of the slot in which the sidelink channel carrying the transmission resource set is located and a time length corresponding to a terminal processing capability.

Optionally, the time length corresponding to the terminal processing capability is expressed by a quantity of time domain symbols.

Optionally, the time length corresponding to the terminal processing capability is determined according to a sub-carrier spacing of a bandwidth part in which the sidelink channel carrying the transmission resource set is located.

Optionally, the time length corresponding to the terminal processing capability includes:
a time length corresponding to a terminal processing delay;
a time length corresponding to a terminal processing time.

Optionally, the starting location of the time domain and/or the ending location of the time domain are determined based on the location of the slot in which the sidelink channel carrying the transmission resource set and a time offset.

Optionally, the time offset is determined based on at least one of the following:
pre-configuration information;
network configuration information;
resource pool configuration information;
second indication information of the first terminal.

Optionally, the starting location of the time domain and/or the ending location of the time domain are determined based on third indication information of the second terminal.

Optionally, the third indication information includes time domain location indication information, and the time domain location indication information includes the starting location of the time domain and/or the ending location of the time domain.

Optionally, the third indication information includes indication information of a resource selection window, and the indication information of the resource selection window includes at least one of the following:
a starting location of the resource selection window;
an ending location of the resource selection window.

Optionally, the starting location of the time domain is determined according to the starting location of the resource selection window.

Optionally, the ending location of the time domain is determined according to the ending location of the resource selection window.

Optionally, the third indication information includes information of a resource reservation period.

Optionally, the starting location of the time domain and/or the ending location of the time domain are determined based on the resource reservation period and a location of a slot in which a sidelink channel carrying the third indication information is located.

Optionally, the starting location of the time domain and/or the ending location of the time domain are determined based on the resource reservation period, a reserved slot of the second terminal and the location of the slot in which the sidelink channel carrying the third indication information is located.

Optionally, the starting location of the time domain and/or the ending location of the time domain are determined based on a length of the time domain.

Optionally, the length of the time domain is determined based on at least one of the following:
pre-configuration information;
a protocol stipulation;
network configuration information;
resource pool configuration information;
fourth indication information of the second terminal.

Optionally, the fourth indication information includes a packet delay budget (PDB), the length of the time domain is determined based on the PDB.

Optionally, the fourth indication information includes a time length or a quantity of slots, the length of the time domain is determined based on the time length or the quantity of slots.

Optionally, the fourth indication information includes an index value, and the length of the time domain is determined based on the index value and a first corresponding relationship.

Optionally, the first corresponding relationship is pre-configured, network configured, or determined based on fifth indication information of the second terminal.

Optionally, the first time-frequency range includes a starting location of a frequency domain and/or an ending location of a frequency domain.

Optionally, the starting location of the frequency domain and/or the ending location of the frequency domain are determined based on the resource pool configuration information.

Optionally, the resource pool configuration information includes at least one of the following: an index of an initial sub-channel, a size of a sub-channel and a quantity of sub-channels of the resource pool.

Optionally, the starting location of the frequency domain and/or the ending location of the frequency domain are determined based on sixth indication information of the second terminal.

Optionally, the sixth indication information includes the resource pool configuration information.

Optionally, the sixth indication information includes the starting location of the frequency domain and the ending location of the frequency domain.

Optionally, the sixth indication information includes the starting location of the frequency domain and a length of the frequency domain;
   the ending location of the frequency domain is determined by the second terminal based on the starting location of the frequency domain and the length of the frequency domain.

Optionally, the sixth indication information includes the ending location of the frequency domain and a length of the frequency domain;
   the starting location of the frequency domain is determined by the second terminal based on the ending location of the frequency domain and the length of the frequency domain.

Optionally, the sixth indication information includes the starting location of the frequency domain;
   the ending location of the frequency domain is determined by the second terminal based on the starting location of the frequency domain and a length of the frequency domain.

Optionally, the sixth indication information includes the ending location of the frequency domain;
   the starting location of the frequency domain is determined by the second terminal based on the ending location of the frequency domain and a length of the frequency domain.

Optionally, the length of the frequency domain is determined based on at least one of:
   pre-configuration information;
   a protocol stipulation;
   network configuration information.

Optionally, the starting location of the frequency domain and/or the ending location of the frequency domain are determined based on the pre-configuration information or the protocol stipulation.

The second terminal 500 of the implementation of the present application can realize the corresponding functions of the second terminal in the aforementioned method implementations. The flow, function, implementation mode and beneficial effect corresponding to each module (sub-module, unit or component, etc.) in the second terminal 500 can be referred to the corresponding description in the above method implementations, and will not be repeated here. It should be noted that the functions described with respect to each module (sub-module, unit, component, etc.) in the second terminal 500 of the implementation of the present application may be realized by different modules (sub-module, unit, component, etc.) or by the same module (sub-module, unit, component, etc.).

Figure 15:
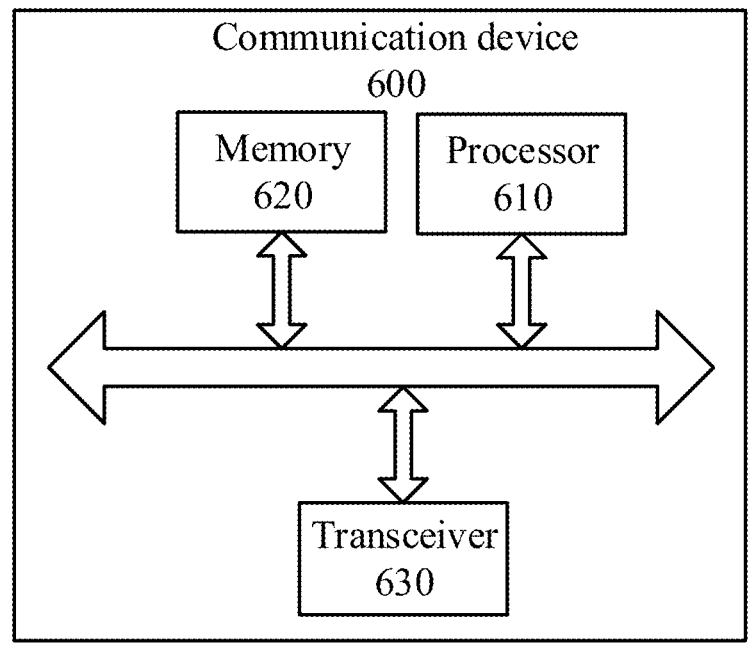
FIG. 15 is a schematic block diagram of a communication device according to an implementation of the present application.

FIG. 15 is a schematic diagram of a structure of a communication device 600 according to an implementation of the present application. The communication device 600 includes a processor 610. The processor 610 may call and run a computer program from a memory to enable the communication device 600 to implement the method in the implementations of the present application.

Optionally, the communication device 600 may further include a memory 620. The processor 610 may call and run the computer program from the memory 620 to enable the communication device 600 to implement the method in the implementations of the present application.

The memory 620 may be a separate device independent of the processor 610 or may be integrated in the processor 610.

Optionally, the communication device 600 may further include a transceiver 630, and the processor 610 may control the transceiver 630 to communicate with another device.

Specifically, information or data may be sent to another device, or information or data sent by another device may be received.

The transceiver 630 may include a transmitter and a receiver. The transceiver 630 may further include antennas, the quantity of which may be one or more.

Optionally, the communication device 600 may specifically be the network device of the implementations of the present application, and the communication device 600 may implement corresponding processes implemented by the network device in various methods of the implementations of the present application, which will not be repeated here for brevity.

Optionally, the communication device 600 may be the terminal device of the implementations of the present application, such as the first terminal or the second terminal, and the communication device 600 may perform corresponding processes implemented by the terminal device in various methods of the implementations of the present application, which will not be repeated here again for brevity.

Figure 16:
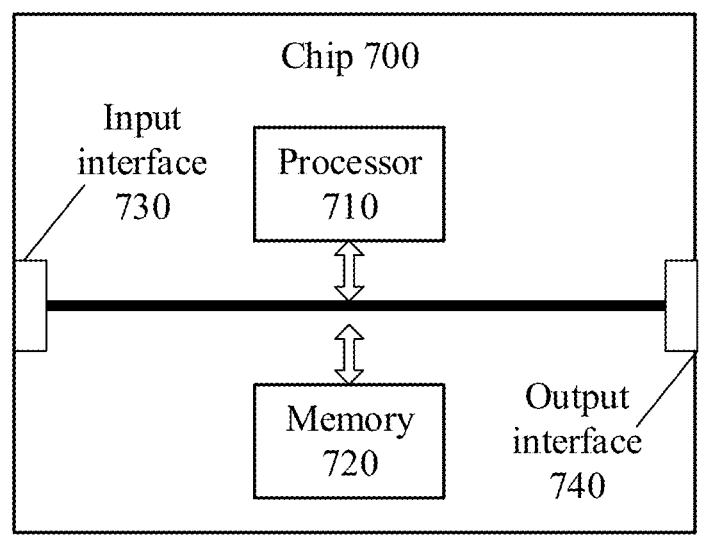
FIG. 16 is a schematic block diagram of a chip according to an implementation of the present application.

FIG. 16 is a schematic diagram of a structure of a chip 700 according to an implementation of the present application. The chip 700 includes a processor 710. The processor 710 may call and run a computer program from a memory to implement the method in the implementations of the present application.

Optionally, the chip 700 may further include a memory 720. The processor 710 may call and run the computer program from the memory 720 to implement the method executed by the terminal device or a network device in implementations of the present application.

The memory 720 may be a separate device independent of the processor 710 or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the network device in the implementation of the present application, and the chip may implement the corresponding processes implemented by the network device in various methods in the implementations of the present application, which will not be repeated herein for brevity.

Optionally, the chip may be applied to the terminal device in the implementation of the present application, and the chip may implement the corresponding processes implemented by the terminal device in the various methods in the implementations of the present application, which will not be repeated herein for brevity.

The chips applied to the network device and the terminal device may be the same chip or different chips.

It should be understood that the chip mentioned in the implementations of the present application may also be referred to as a system-level chip, a system chip, a chip system, or a system on chip, etc.

The processor above-mentioned may be a general purpose processor, a digital signal processor (DSP), a field programmable gate array (FPGA), an application specific integrated circuit (ASIC) or other programmable logic devices, a transistor logic device, or a discrete hardware component, etc. The above-mentioned general-purpose processor may be a microprocessor or any conventional processor, etc.

The above-mentioned memory may be a volatile memory or non-volatile memory, or may include both volatile and non-volatile memories. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM).

It should be understood that, the above-mentioned memories are examples for illustration and should not be construed as limitations. For example, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is to say, the memories in the implementations of the present application are intended to include, but are not limited to, these and any other suitable types of memories.

Figure 17:
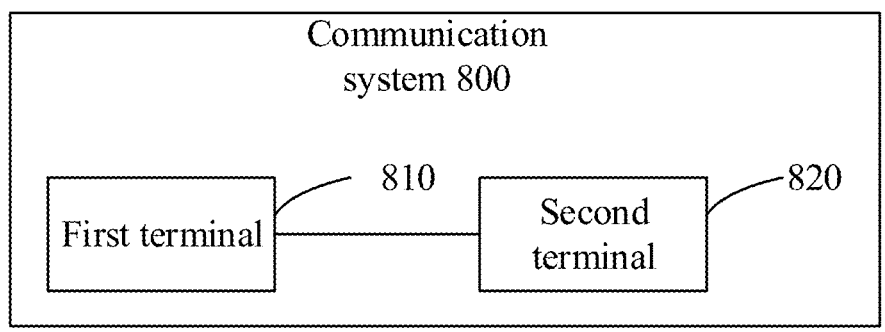
FIG. 17 is a schematic block diagram of a communication system according to an implementation of the present application.

FIG. 17 is a schematic block diagram of a communication system 800 according to an implementation of the present application. The communication system 8000 includes: a first terminal 810 and a second terminal 820.

The first terminal is used for sending a transmission resource set to the second terminal, wherein a transmission resource included in the transmission resource set belongs to transmission resources in a first time-frequency range.

The second terminal is used for receiving the transmission resource set from the first terminal.

Herein, the first terminal 810 may be used for performing the corresponding functions implemented by the first terminal in the above methods, and the second terminal 820 may be used for performing the corresponding functions implemented by the second terminal in the above methods, which will not be repeated here again for brevity. The above-mentioned implementations can be implemented in whole or in part through software, hardware, firmware, or any combination thereof. When implemented through software, they can be implemented in whole or in part in the form of a computer program product. The computer program product includes one or more computer instructions. When the computer program instructions are loaded and executed on a computer, flows or functions in accordance with the implementations of the present application are generated in whole or in part. The computer may be a general purpose computer, a special purpose computer, a computer network, or another programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that can be accessed by a computer or a data storage device such as a server, a data center, or the like that integrates one or more available media. The available media may be magnetic media (e.g., a floppy disk, a hard disk, a magnetic tape), optical media (e.g., a Digital Versatile Disk, (DVD)), or semiconductor media (e.g., a Solid State Disk (SSD)), or the like.

It should be understood that in various implementations of the present application, the sizes of serial numbers in various processes described above does not imply an order of execution of various processes, which should be determined by their functions and internal logics, and should not constitute any limitation on implementation processes of the implementations of the present application.

Those skilled in the art may clearly understand that for the sake of convenience and conciseness of description, the specific working processes of the systems, devices and units described above may be described with reference to the corresponding processes in the above method implementations and will not be repeated herein.

The above are merely specific implementations of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

What is claimed is:

1. A transmission method of a resource set, comprising:
sending, by a first terminal, a transmission resource set to a second terminal, wherein a transmission resource included in the transmission resource set belongs to transmission resources in a first time-frequency range; wherein the first time-frequency range comprises a starting location of a frequency domain and an ending location of a frequency domain; wherein the starting location of the frequency domain and the ending location of the frequency domain are determined based on resource pool configuration information, wherein the resource pool configuration information comprises: an index of an initial sub-channel, a size of a sub-channel and a quantity of sub-channels of a resource pool.

2. The method of claim 1, wherein the first time-frequency range comprises a starting location of a time domain and an ending location of a time domain.

3. The method of claim 2, wherein the starting location of the time domain and/or the ending location of the time domain are determined based on first indication information sent by the first terminal.

4. The method of claim 3, wherein the first indication information is carried in sidelink control information (SCI), or media access control (MAC) control unit (CE).

5. The method of claim 3, wherein the first indication information and the transmission resource set are carried in a same sidelink channel.

6. The method of claim 2, wherein the starting location of the time domain and the ending location of the time domain are determined based on third indication information of the second terminal.

7. The method of claim 6, wherein the third indication information comprises time domain location indication information, wherein the time domain location indication information comprises the starting location of the time domain and the ending location of the time domain.

8. The method of claim 6, wherein the third indication information comprises indication information of a resource selection window, wherein the indication information of the resource selection window comprises:
    a starting location of the resource selection window;
    an ending location of the resource selection window,
    wherein the starting location of the time domain is determined according to the starting location of the resource selection window, and the ending location of the time domain is determined according to the ending location of the resource selection window.

9. The method of claim 6, wherein the third indication information comprises information of a resource reservation period.

10. A first terminal, comprising:
    a transceiver, configured to send a transmission resource set to a second terminal, wherein a transmission resource included in the transmission resource set belongs to transmission resources in a first time-frequency range; wherein the first time-frequency range comprises a starting location of a frequency domain and an ending location of a frequency domain; wherein the starting location of the frequency domain and the ending location of the frequency domain are determined based on resource pool configuration information, wherein the resource pool configuration information comprises: an index of an initial sub-channel, a size of a sub-channel and a quantity of sub-channels of a resource pool.

11. The first terminal of claim 10, wherein the first time-frequency range comprises a starting location of a time domain and an ending location of a time domain.

12. The first terminal of claim 11, wherein the starting location of the time domain and the ending location of the time domain are determined based on first indication information sent by the first terminal.

13. The first terminal of claim 12, wherein the first indication information is carried in sidelink control information (SCI), or media access control (MAC) control unit (CE).

14. The first terminal of claim 12, wherein the first indication information and the transmission resource set are carried in a same sidelink channel.

15. The first terminal of claim 11, wherein the starting location of the time domain and the ending location of the time domain are determined based on third indication information of the second terminal.

16. The first terminal of claim 15, wherein the third indication information comprises time domain location indication information, and the time domain location indication information comprises the starting location of the time domain and the ending location of the time domain.

17. The first terminal of claim 15, wherein the third indication information comprise indication information of a resource selection window, and the indication information of the resource selection window comprises:
    a starting location of the resource selection window;
    an ending location of the resource selection window,
    wherein the starting location of the time domain is determined according to the starting location of the resource selection window, and the ending location of the time domain is determined according to the ending location of the resource selection window.

18. The first terminal of claim 15, wherein the third indication information comprises information of a resource reservation period.

* * * * *